United States Patent [15] 3,653,947
Kandler et al. [45] Apr. 4, 1972

[54] SURFACE-PRETREATMENT OF NON-METALLIC ARTICLES FOR CHEMICAL NICKEL-PLATING

[72] Inventors: Joachim Kandler, Lechenich; Gerhard Mietens, Efferen near Cologne; Michael Ahlgrim, Bliesheim, all of Germany

[73] Assignee: Knapsack Aktiengesellschaft, Knapsack near Cologne, Germany

[22] Filed: July 22, 1969

[21] Appl. No.: 843,811

[30] Foreign Application Priority Data

Aug. 1, 1968 Germany ..................... P 17 71 930.1

[52] U.S. Cl. ..................... 117/47 A, 106/1, 117/138.8 UA, 117/160 R
[51] Int. Cl. ......................................................... C23c 3/02
[58] Field of Search ............. 117/47 A, 138.8, 130 E; 106/1, 106/160, 4

[56] References Cited

UNITED STATES PATENTS 3,167,491 1/1965 Harrison et al. ................... 117/47 A X
3,437,507 4/1969 Jensen ................................ 117/47 A
3,484,282 12/1969 Gabler et al. ...................... 106/1 X Primary Examiner—Ralph S. Kendall
Attorney—Connolly and Hutz

[57] ABSTRACT

Pretreatment of surfaces of non-metallic articles for chemical nickel-plating. The surface of the article is treated using a pickling solution of concentrated sulfuric acid containing one or more noble metal salts and the noble metal salt adhered to the surface of the article is subsequently reduced to metal to activate the surface, using an aqueous solution of a reducing agent. The pickling step and the reductive activation of the surface of the article are carried out while using the solutions at a uniform temperature of between about 75° and 90° C., and adding a polyphosphonic acid stabilizer to the aqueous solution of the reducing agent.

9 Claims, No Drawings

SURFACE-PRETREATMENT OF NON-METALLIC ARTICLES FOR CHEMICAL NICKEL-PLATING

The present invention relates to the pretreatment of surfaces of non-metallic articles for chemical nickel-plating, by chemically roughening and activating the surface of the article to be nickel-plated.

German specification 1 182 015 describes a process which enables the surfaces of non-metallic articles to be treated to receive, for example, a metallic nickel-plating. To this end, the surface is first cleaned and then mechanically roughened using emery or sand. The article with the surface so treated is activated by dipping it in a palladium salt solution and subsequently reducing the palladium salt deposited thereon, so as to produce palladium nuclei. Following this, the article so activated is nickel-plated in conventional manner by dipping it in a chemical nickel-plating bath having nickel ions and hypophosphite ions therein. The expression "pretreatment of the article to be plated" means all steps which are carried out prior to the actual nickel-plating. The process described above can be used, for example, for metallizing the surface of plastics, rubber, glass, wooden or ceramic materials. The aqueous palladium salt solution suitable for surface activation preferably has a concentration of 35 milligrams per liter. When a hypophosphite salt is the reducing agent for the palladium salt, it is advantageous for it to be dissolved in the metallizing bath, in a concentration of 0.225 mol per liter. The steps suggested to be used in the above patent for the pretreatment of the article to be metallized are, however, not fully satisfactory. The reason for this resides more particularly in the mechanical roughening treatment of the article's surface, which is rather expensive with respect to time, material and work.

A further process for the pretreatment of plastics surfaces for chemical plating has been described in German published specification 1 264 921. It has been shown therein that it is substantially more advantageous for polystyrene copolymer-plastics of the acrylonitrile/butadiene/styrene-series to be pretreated for chemical plating, using a solution which enables the plastics surface to be roughened and activated simultaneously. This is achieved by using the roughening solution in combination, for example, with a mixture of concentrated sulfuric acid and chromic anhydride, and noble metal salts, such as silver salts, which immediately diffuse into the plastics while its surface is changed under the action of the solution. During the reduction which follows, the pretreatment effects the formation of noble metal nuclei which tenaciously adhere to the plastics surface, and make chemically and electrically deposited metal layers tenaciously adhere thereto. As shown in Example 4 of German published specification 1 264 921, the metal layer deposited on the plastics was found to have a bond strength of between 1 and 2 kiloponds, based on DIN 40 802 (German Industrial Standard).

The object of the present invention is to increase the bond strength of metal layers chemically deposited on the surfaces of non-metallic articles by subjecting the articles to be metallized to improved pretreatment methods, and to prevent palladium ions from being introduced into and catalytically decomposing the metallizing bath.

The process of the present invention for the pretreatment of surfaces of non-metallic articles for chemical nickel-plating, wherein the surface of the article is treated using a pickling solution of concentrated sulfuric acid containing one or more noble metal salts and, optionally, an oxidant, and the noble metal salt adhered to the surface of the article is subsequently reduced to metal to activate the surface, using an aqueous solution of a reducing agent, preferably an aqueous sodium hypophosphite solution, comprises carrying out the pickling step and the reductive activation of the surface of the article while using the two solutions at a uniform temperature of between about 75° and 90° C., and adding a polyphosphonic acid stabilizer to the aqueous solution of the reducing agent.

The noble metal dissolved in the sulfuric acid pickling solution is preferably a palladium salt, more preferably palladium chloride. The sulfuric acid contains the noble metal salt in a concentration of between about 0.1 and 0.5 gram per liter, preferably 0.3 gram per liter. The pickling solution may be used in further combination with an oxidant, for example nitric acid, hydrogen peroxide, chromic acid or one or more alkali metal persulfates.

A preferred feature of the process of the present invention comprises using the sulfuric acid pickling solution and the aqueous solution of the reducing agent at a temperature of 80° C.

A still further feature of the present invention comprises stabilizing the aqueous solution of the reducing agent, preferably by means of hydroxyethanediphosphonic acid. This stabilizer as well as further suitable polyphosphonic acid stabilizers are preferably used in a concentration of between 1 and 20 grams per liter, in an aqueous 50 percent by weight solution of the reductant.

The bond strength of the metal layer to be deposited on the articles has been found to be influenced by the periods during which the article to be metal-plated is dipped in the pickling solution, and in the solution of the reductant. These periods should be preferably be between about 2 and 20 minutes for each of the two solutions. Nickel-plated plastics articles based on acrylonitrile/butadiene/styrene-copolymers, impact-resistant polystyrenes, and styrene/acrylonitrile-copolymers have been found to have an especially good bond strength.

The process of the present invention is generally carried out in the following manner: The degreased and superficially cleaned article is dipped for a certain period of time, for example, in a pickling solution heated to substantially 80° C. and containing, for example, a palladium salt, and the article so pickled is rinsed using flowing water. Following this, the palladium ions, which are found to achieve to the surface of the article, are reduced to metallic palladium nuclei, using an aqueous reducing solution, for example a sodium hypophosphite solution, having a polyphosphonic acid stabilizer therein, and a temperature again of substantially 80° C., and the article is rinsed again using flowing water. No further pretreatment is necessary in accordance with the present invention. The article can then be nickel-plated in conventional manner in a chemical metallizing bath, for example in the manner described in German specifications 1 182 015 or 1 193 764.

As compared with conventional techniques, the process of the present invention offers the following advantages:

1. The use of the pickling or activation bath and of the reducing bath at uniform temperatures of between about 75° and 90° C. effects substantially complete reduction of the noble metal ions adhered to the surface of the article. This prevents the said ions from being introduced into and from catalytically decomposing the chemical nickel-plating bath.
2. The temperature range of between about 75° and 90° C. suggested to be used in accordance with this invention for the pretreatment baths has been found to produce optimum results for a wide variety of plastics materials. Lower temperatures, such as those used in conventional processes, have been found to affect the bond strength of the metal-plating applied to the article.
3. The use of the reducing solution in combination with polyphosphonic acids definitely prevents the reducing agent, for example sodium hypophosphite, from being catalytically decomposed by the noble metal ions.
4. As compared with the process described in German specification 1 264 921, the present invention enables the bond strength of a nickel-plating applied to plastics of the acrylonitrile/butadiene/styrene-series to be increased from 1 to 2 kiloponds to 3 to 5 kiloponds, based on German Industrial Standard 40 802.

EXAMPLE 1

A plastics sheet based on an acrylonitrile/butadiene/styrene-copolymer was dipped for 10 minutes in a pickling solution heated to 80° C. and subsequently rinsed for 5 minutes using flowing water. The pickling solution was composed of:

| | | |
|---|---|---|
| 1000 | grams $H_2SO_4$ | (96% strength) |
| 290 | grams $H_3PO_4$ | (85% strength) |
| 15 | grams $CrO_3$ | |
| 270 | grams $H_2O$ | |
| 0.3 | gram $PdCl_2$ | |

The palladium ions, which adhered to the surface of the plastics sheet, were reduced to metallic palladium within 10 minutes, using an aqueous reducing solution heated to 80° C. Following this, the plastics sheet was rinsed again for 10 minutes, using flowing water. The reducing solution contained 50 grams $NaH_2PO_2 \cdot H_2O$ and 5 milligrams of an aqueous 50 percent by weight solution of hydroxyethanediphosphonic acid, dissolved in 1 liter water.

The plastics sheet so pretreated was chemically nickel-plated in a commercial nickel-plating bath. The resulting nickel layer was found to be 0.5 micron thick. The nickel-plating bath was composed of:

| | | |
|---|---|---|
| $NiSO_4 \cdot 7H_2O$ | 0.11 | mol per liter |
| $NaH_2PO_2 \cdot H_2O$ | 0.28 | mol per liter |
| Nitrilotrismethylene-phosphonic acid | 0.12 | mol per liter |
| $Na_2HPO_4 \cdot 2H_2O$ | 0.067 | mol per liter |
| $KH_2PO_4$ | 0.0067 | mol per liter |

Sodium hydroxide solution was added to the bath to establish a pH-value of 5.5 therein. The bath temperature was 55° C.

The nickel-plating applied to the plastics sheet was found to have a bond strength of 3 to 5 kiloponds, based on German Industrial Standard 40 802.

EXAMPLE 2

A pressed sheet with the dimensions 150 × 150 × 20 mm., made from an acrylonitrile/butadiene/styrene-copolymer, was dipped for 8 minutes in a pickling solution heated to 85° C. and having the composition indicated in Example 1. Following this, the sheet was rinsed for 10 minutes using flowing water and dipped then for 8 minutes in the reducing solution heated to 85° C. The sheet was rinsed again for 10 minutes in flowing water and chemically nickel-plated using the commercial nickel-plating bath of Example 1. The thickness of the chemically deposited nickel layer was increased to 30 microns by electro-depositing thereon a polished nickel coating.

The sheet so metal-plated was subjected three times, each time for 24 hours, to an alternate climate test with temperature changes from +100° to −30° C. Peeling off was not observed.

What is claimed is:

1. In the process for the pretreatment of surfaces of non-metallic articles made from copolymers selected from the group consisting of acrylontrile/butadiene/stryrene-copolymers, polystyrenes and styrene/acrylonitrile-copolymers for chemical nickel-plating, wherein the surface of the article is treated using a pickling solution of concentrated sulfuric acid having a temperature of about 75° to 90° C. and containing one or more noble metal salts, and the noble salt adhered to the surface of the article is reduced to metal to activate the surface, using an aqueous solution of a reducing agent, the improvement which comprises carrying out the reductive activation of the surface of the article by using a 50 percent by weight aqueous solution of sodium hypophosphite containing a hydroxyethanediphosphonic acid stabilizer at a rate of between 1 and 20 grams per liter said solution having a temperature of between 75° and 90° C.

2. The process of claim 1, wherein the noble metal salt is a palladium salt.

3. The process of claim 2, wherein the palladium salt is palladium chloride.

4. The process of claim 1, wherein the sulfuric acid contains the noble metal salt in a concentration of between about 0.1 and 0.5 gram per liter.

5. The process of claim 4, wherein the sulfuric acid contains the noble metal salt in a concentration of 0.3 gram per liter.

6. The process of claim 1, wherein the noble metal salt-containing solution is a solution of concentrated sulfuric acid having an additional oxidant therein.

7. The process of claim 6, wherein the oxidant is a member selected from the group consisting of nitric acid, hydrogen peroxide, chromic acid and alkali metal persulfate.

8. The process of claim 1, wherein the pickling solution and the aqueous solution of the reducing agent are used at a temperature of 80° C.

9. The process of claim 1, wherein the article is dipped in the pickling solution and subsequently in the solution of the reducing agent for a period of between about 2 and 20 minutes, in each case.

* * * * *